(12) United States Patent
Gal

(10) Patent No.: US 8,059,150 B2
(45) Date of Patent: Nov. 15, 2011

(54) SELF CONTAINED COMPACT AND PORTABLE OMNI-DIRECTIONAL MONITORING AND AUTOMATIC ALARM VIDEO DEVICE

(75) Inventor: Ehud Gal, Reut (IL)

(73) Assignees: Wave Group Ltd., Tel-Aviv (IL); O.D.F. Optronics Ltd., Tel-Aviv (IL)

( * ) Notice: Subject to any disclaimer, the term of this patent is extended or adjusted under 35 U.S.C. 154(b) by 1104 days.

(21) Appl. No.: 11/899,564

(22) Filed: Sep. 6, 2007

(65) Prior Publication Data

US 2008/0062255 A1   Mar. 13, 2008

(51) Int. Cl.
*H04N 7/00* (2006.01)
(52) U.S. Cl. ............... 348/37; 348/36; 348/38; 348/39; 348/143
(58) Field of Classification Search .............. 348/36, 348/37, 38, 39, 143; 359/725
See application file for complete search history.

(56) References Cited

U.S. PATENT DOCUMENTS

| | | | |
|---|---|---|---|
| 5,790,182 A | 8/1998 | St. Hilaire | |
| 6,304,285 B1 | 10/2001 | Geng | |
| 6,523,006 B1 | 2/2003 | Ellis et al. | |
| 6,738,631 B1 | 5/2004 | Adler et al. | |
| 6,937,266 B2 * | 8/2005 | Rui et al. | 348/14.05 |
| 7,298,392 B2 * | 11/2007 | Cutler | 348/36 |
| 7,495,694 B2 * | 2/2009 | Cutler | 359/725 |
| 7,940,299 B2 * | 5/2011 | Geng | 348/143 |
| 2003/0071891 A1 | 4/2003 | Geng | |
| 2004/0263611 A1 * | 12/2004 | Cutler | 348/36 |
| 2006/0023074 A1 * | 2/2006 | Cutler | 348/218.1 |
| 2008/0062255 A1 * | 3/2008 | Gal | 348/37 |
| 2008/0122922 A1 * | 5/2008 | Geng | 348/39 |

FOREIGN PATENT DOCUMENTS

| | | |
|---|---|---|
| WO | WO 03/026272 | 3/2003 |
| WO | WO 02/059676 | 11/2003 |
| WO | WO 2004/008185 | 1/2004 |
| WO | WO 2004/042428 | 5/2004 |

* cited by examiner

*Primary Examiner* — Quang N. Nguyen
(74) *Attorney, Agent, or Firm* — Frommer Lawrence & Haug LLP; William S. Frommer

(57) ABSTRACT

The present invention is a self contained portable and compact omni-directional monitoring and automatic alarm video device. The device enables automatic omni-directional detection, directional imaging inspection, tracking, real-time alarm transmission, and remote monitoring. The device comprises an omni-directional detection sensor, processor, and directional video imaging camera located inside a rotatable housing. The omni-directional detection sensor enables detection of moving objects near the device's surroundings; the processing assembly enables extraction of information such as the relative direction to the moving object and automatic pointing of the directional video imaging camera in that direction by rotation of the housing. The information acquired by the video camera is then transmitted to a remote control and observation unit.

17 Claims, 4 Drawing Sheets

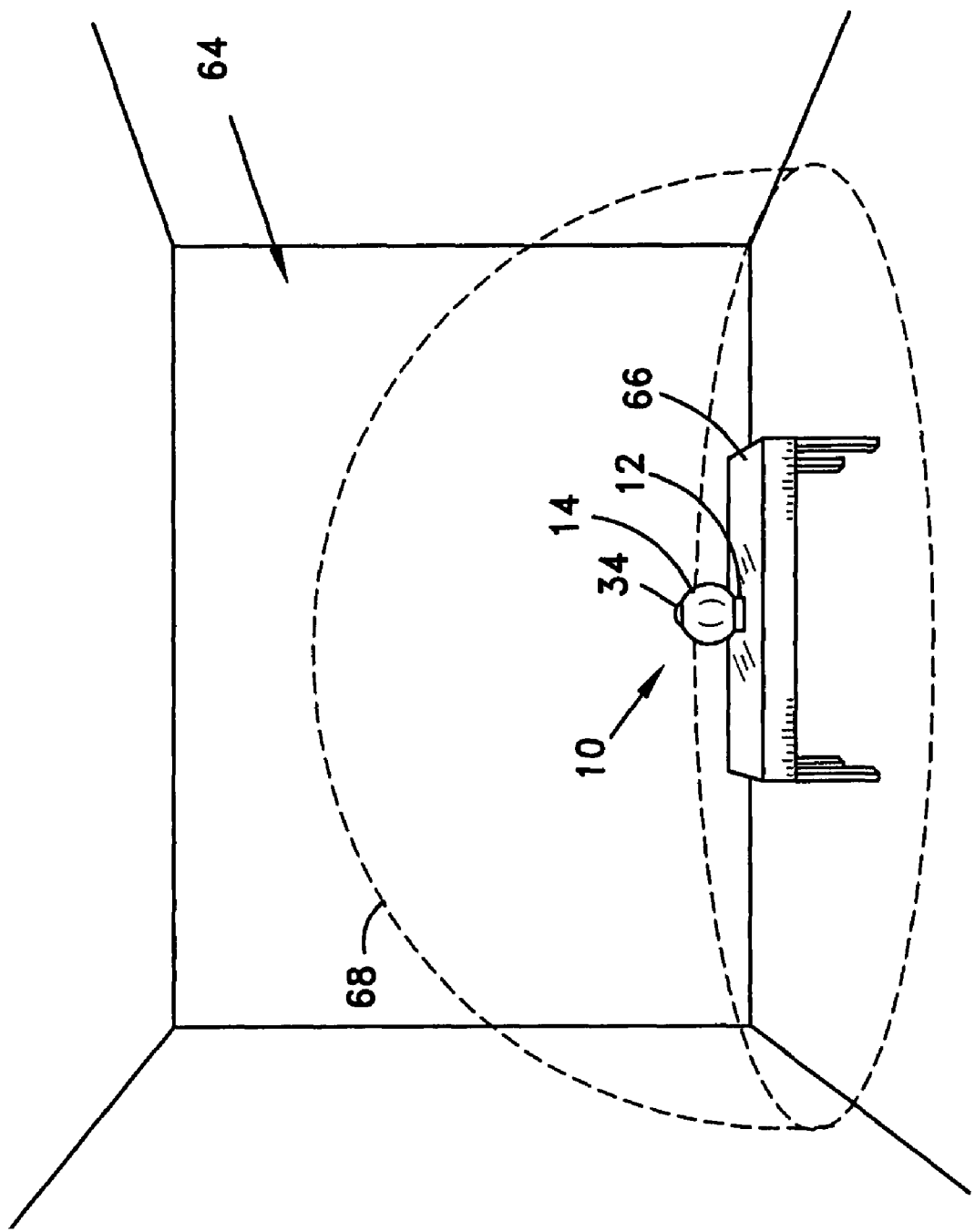

SELF CONTAINED COMPACT AND PORTABLE OMNI-DIRECTIONAL MONITORING AND AUTOMATIC ALARM VIDEO DEVICE

FIELD OF THE INVENTION

The invention is related to the field of monitoring systems. In particular the invention relates to devices for automatic observation and sensing of relatively large regions of interest and having the ability to detect and acquire detailed information concerning predetermined events that take place within those areas and for transferring the detailed information to a remote reception or observation unit.

BACKGROUND OF THE INVENTION

Nowadays, there is are variety of monitoring systems that can be used to observe a given region of interest (ROI) and transmit information concerning events taking place within the ROI to a control system where the information can be evaluated. Some systems consist of video cameras which transmit continuous video streaming to a security center; there, a watchman monitors the occurrences and reacts when needed; in these systems the watchman monitors simultaneously all the video streaming received from each security camera covering the ROI. Another category of monitoring systems is home self monitoring systems; these systems enable the user to log on to the video camera by a remote computer or a cellular phone, and to watch real time images of the occurrences; some systems also enable remote control over the camera via the computer or the cellular phone. These systems are usually used for monitoring babies, housekeepers, or the elderly and for amusement.

The majority of these monitoring systems acquire optical images using either fixed cameras or cameras that continually scan the ROI or that are mounted on a pan-tilt-zoom (PTZ) mechanism that allows them to be aimed, usually from the remote control room. In addition, cameras using special optics enabling omni-directional imaging are also abundant. Many commercial optical systems enabling a wide Field Of View (FOV) are available. Some of these, known as "Fish Eye" lenses, provide about up to 180° FOV. They are also known as half sphere FOV. In addition, some advanced optic lenses enable observation at a selected preplanned FOV, such optics enable almost up to 360° FOV and some enable in addition ZOOM capabilities at predefined ROIs. The information required by the lenses can be displayed on a computer screen in order to assist the observer to orient at the parametrical images.

A short list of publications describing methods and systems for applying Omni-directional optical imaging follows:

U.S. Pat. No. 6,304,285—describes a system comprising a hemispherical mirror and a projector with a changeable wavelength filter which is positioned in accordance to the mirror thus enable the requiring of an 180° FOV.

U.S. Pat. No. 5,790,182—describes a system comprising two mirrors positioned relative to one another at the "Golden Relation" thus providing a wide field of view.

PCT Publication WO 02/059676—describes lenses with asymmetric convex surfaces that enable a wide FOV.

PCT Publication WO 03/026272—describes systems based on lenses having an asymmetric surface and a symmetric surface.

PCT Publication WO 04/042428—describes lenses which enable acquiring an omni-directional FOV and in addition simultaneously provide omni-directional illumination of the lens's FOV.

PCT Publication WO 04/008185—describes systems that enable omni-directional observation using a central asymmetric lens and additional lenses in accordance.

US Patent Application 2003/0071891—describes a system comprised of an omni-directional camera and a higher resolution camera which can be aimed by a host computer.

What is not available in the prior art to the inventor's knowledge is a device comprising an omni-directional sensor assembly to monitor events over a wide ROA, a processing assembly to detect the occurrence of predetermined events that take place within that ROA, means to automatically rotate the device such that a directional video camera contained within the device is aimed at the location at which the event takes place and is used for closer inspection of the event, and processes and sends video images and other information concerning the event to a remote reception or observation unit.

The purpose of the present invention is to provide a self contained, compact, and portable device comprising omni-directional detection and directional inspection means as well as means that enable automatic transmission and documentation of predefined events to a remote receiving and observation unit.

Another purpose of the present invention is to provide means for rotating the housing of the device relative to the base.

Another purpose of the present invention is to provide means for automatic aiming of a directional video camera inside the housing of the device while both the omni-directional detection means and directional video camera are rotating inside the device's housing.

Another purpose of the present invention is to provide means to allow unlimited rotation of the housing relative to the base while avoiding tangling of power and communication wires.

Yet another purpose of the present invention is to save human resources at security centers by filtering the acquired information such that only predefined alerts are sent automatically for the watchman's review.

Further purposes and advantages of this invention will appear as the description proceeds.

SUMMARY OF THE INVENTION

The invention is a self contained, compact, portable observation device comprising a static base, a rotatable housing, and means for rotating the housing relative to the base. The rotatable housing comprises omni-directional detection means, directional inspection means, a processing assembly for identifying the occurrence of predetermined events within the field of view of the omni-directional detection and for automatic aiming of the directional inspection means at the location at which the predefined events take place, and a communication assembly that enables automatic transmission and documentation of predefined events to a remote receiving and observation unit.

The device of the invention comprises a slip ring assembly configured to allow two-way transmission of electrical power and signals between the base and electric components inside the housing while avoiding tangling wires while the housing undergoes unlimited rotation in either direction relative to the base.

The omni-directional detection means comprises one or more of imaging sensors, microphone arrays, volume detector arrays, or heat detectors. In preferred embodiments the omni-directional detection means comprises omni-directional optics integrated to a video camera system.

The housing may additionally comprise one or more non-optical sensors to measure other phenomenon of interest. Examples of such sensors are: light detectors, smoke detectors, fire detectors, carbon monoxide detectors, and temp detectors.

In preferred embodiments of the device of the invention the directional inspection means comprises a directional video imaging camera.

The device according of the invention may comprise a plurality of peripheral LEDs spaced around the top of the housing for providing illumination for the omni-directional optics wherein the LEDs provide illumination in the spectral range to which the optics are sensitive. and/or a plurality of directional LEDs mounted near the objective lens of the directional video imaging camera for illuminating the scene imaged by the directional imaging camera, wherein the LEDs provide illumination in the spectral range to which the camera is sensitive.

Embodiments of the device of the invention may comprise a microphone, and/or speaker and/or siren. The microphone gathers audio information that can be used by the processing means as an alarm trigger/filter and can be also used for remote listening to sounds associated with the events portrayed in the video images transmitted to the remote receiving and observation unit. The speaker enables mutual audio communication between persons at the device's surroundings and the remote user and enabling the device to be used as an IP camera and/or as a communication device in a video conference system. The siren can be activated automatically by the processor of the device when a predetermined event is detected and/or manually by a signal from the remote reception and observation unit.

The processing assembly comprises a Digital Signal Processor (DSP) with integrated software that is capable of extracting the general direction of a predetermined phenomenon from data provided by the omni-directional sensor assembly and/or any additional sensors that may be present the device. The DSP may be capable of providing Video Motion Detection (VMD), which allows detection of moving objects from the information obtained by the omni-directional detection sensor assembly. The DSP may be capable of enabling sensor fusion to enable automatic alarm filtering and Image Understanding (IU) capabilities according to pre-defined characteristics. The DSP may enable automatic detection of distress situations. In embodiments of the device of the invention the processing assembly comprises means for automatic documentation of predefined events.

In preferred embodiments of the device the communication assembly provides advanced means of communication and documentation for transmitting data, including streaming audio and video signals, to the remote reception and observation unit. The communication assembly provides means for receiving signals from the remote unit to enable logging on to the device for remote monitoring and to enable transfer of control and operation commands to the device.

In embodiments of the device the remote reception and observation unit may be one or more of the following: a cellular phone, a personal digital assistant (PDA), a laptop, a PC, or a service provider.

An internal rechargeable energy pack is preferably located in the static base. The power pack supplies electrical energy to electronic components inside the housing to enable limited operation periods and also serves as back up during electrical power interruptions. Preferably the device comprises a power plug located in the base and in electrical communication with the interior of the housing via the slip ring assembly. The power plug enables recharge of the energy pack and supplies electrical energy when extended operation of the device is required. A plug may be provided in the base for wired network connection. This plug is electrically connected to the slip ring assembly to enable transmission of information acquired by the sensors to a wired network and transmission of operating commands received via the wired network to the processing assembly.

All the above and other characteristics and advantages of the invention will be further understood through the following illustrative and non-limitative description of preferred embodiments thereof, with reference to the appended drawings.

BRIEF DESCRIPTION OF THE DRAWINGS

FIGS. 3A and 3B schematically depict one scenario illustrating the use of the device.

DETAILED DESCRIPTION OF PREFERRED EMBODIMENTS

The present invention is a self contained portable and compact omni-directional monitoring and automatic alarm video device. The device enables automatic omni-directional detection, directional imaging inspection, tracking, real-time alarm transmission, and remote monitoring. The device comprises an omni-directional detection sensor, processor, and directional video imaging camera located inside a rotatable housing. The omni-directional detection sensor enables detection of moving objects near the device's surroundings; the processing assembly enables extraction of information such as the relative direction to the moving object and automatic pointing of the directional video imaging camera in that direction by rotation of the housing. The information acquired by the video camera is then transmitted to a remote control and observation unit.

Figure 1:
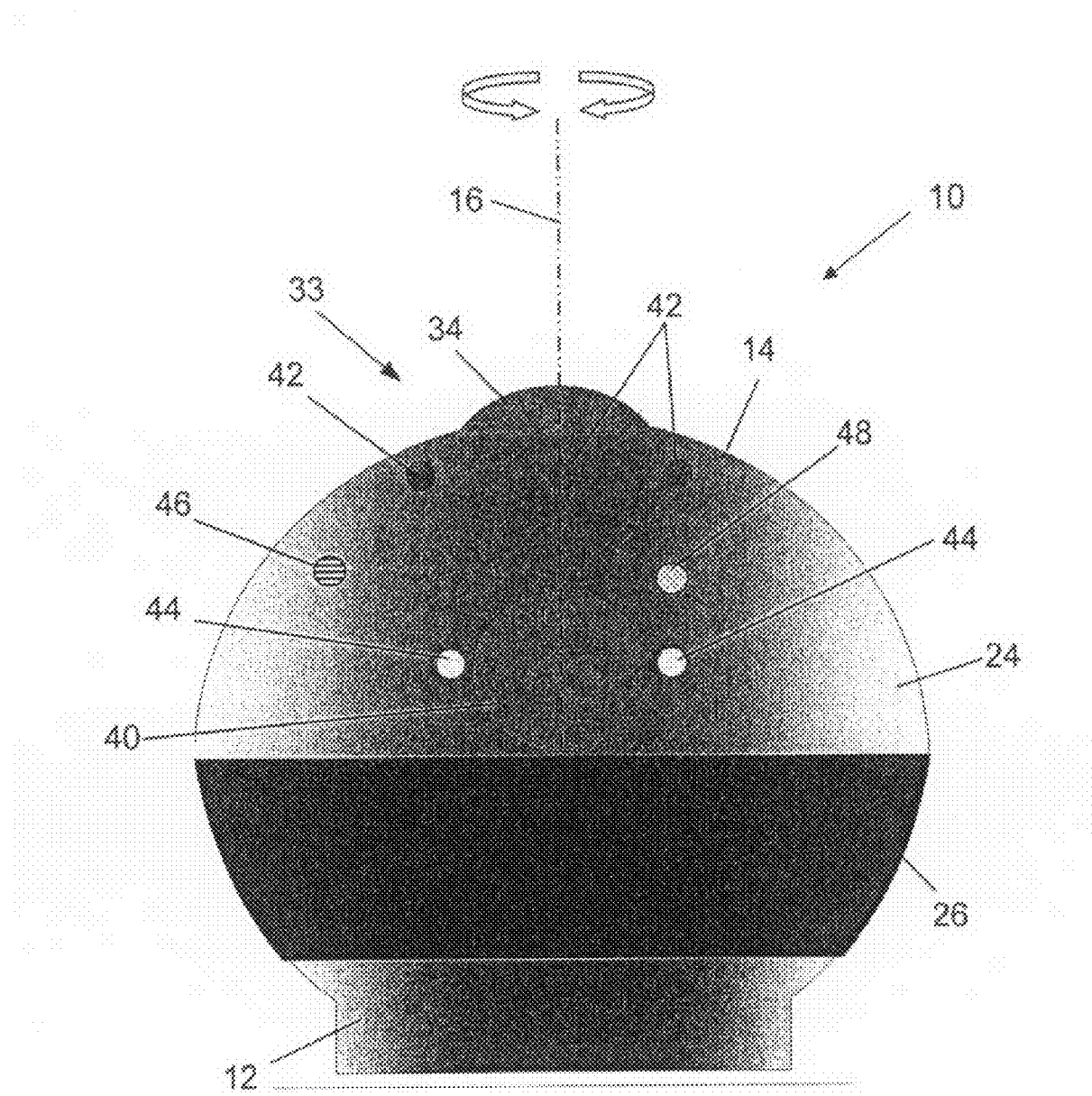
FIG. 1 is an external view of the device of the invention.
Figure 2:
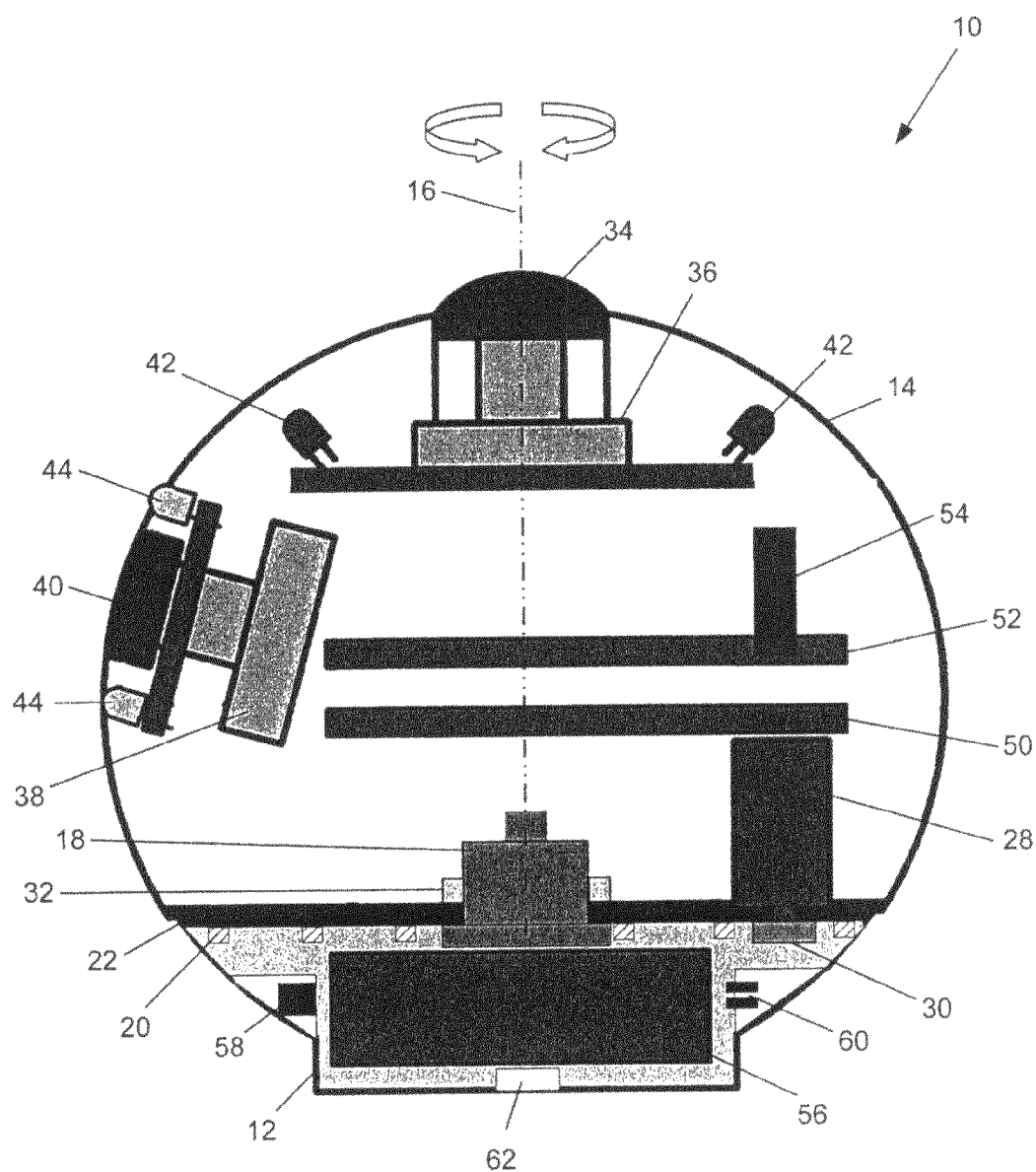
FIG. 2, which is a cross-sectional view schematically showing the major internal components of the device of the invention.

The main components of the device are shown in FIG. 1, which is an external view of the device 10 and in FIG. 2, which is a cross-sectional view of FIG. 1 showing the internal components of the device 10. The main components are:

a. A static base 12, used to support the device at a desired location. The inside of the base is hollowed out. At the upper surface of static base 12 is affixed a cylindrical post 18 that projects through the surface. Around the circumference of the inner upper rim of base 12 is created a series of projections that are the teeth of a gear 20 that is an integral part of the base.

b. A rotatable housing 14 contains in its interior most of the other components of the device. Housing 14 is comprised of an inner framework (not shown in the figures for clarity) that supports the various optical and electronic components that will be described herein below. Attached to the inner frame is an outer cover that protects the components inside. For easy maintenance of the device it is convenient to design the outer cover in separate sections, e.g. upper section 24 and lower section 26 as shown in FIG. 1.

The housing 14 has a circular hole (not shown in the figures) through its floor 22. Housing 14 is mounted above the static base 12 by slipping it over cylindrical post 18. The center of the circular hole is located exactly at the geometric center of the floor 22 such that the housing 14 can be rotated about an imaginary vertical rotation axis 16 passing through its center. Known means such as ball bearings can be provided to reduce friction and allow housing 14 to be rotated easily in either direction around post 18.

c. A reversible compact motor 28 is fixedly attached to the floor 22 of housing 14. A gear 30 attached to the shaft of motor 28 has teeth that mesh with gear 20 inside static base 12. Activating motor 28 such that gear 30 rotates while engaged with static gear 20 in the base 12 will cause housing 14 to rotate around the vertical rotation axis 16 relative to static base 12.

d. A slip ring assembly 32 is fastened to floor 22 of housing 14 and fits around post 18. Slip ring assembly 32, which includes suitable electrical contacts (not shown) in static post 18 allows two-way transmission of electrical power and signals between the base 12 and electric components inside the housing 14 while avoiding tangling wires while the housing undergoes unlimited rotation in either direction relative to base 12.

e. An omni-directional detection sensor assembly 33 is located co-axially with the imaginary vertical rotation axis at the upper part of the housing. Examples of omni-directional sensors that can be used with the invention are imaging sensors with special optics, microphone arrays, volume detector arrays, heat detector arrays, or a combination of these. The exemplary omni-directional detection sensor assembly shown in the figures is comprised of omni-directional optics 34 integrated to a video camera system 36. The exact type and design of the omni-directional detection sensor assembly is not essential to the practice of the invention and any assembly that is capable of providing the information concerning events that take place in the surroundings of device 10 that satisfies the requirements of the user of device 10 can be used. Descriptions of typical omni-directional optical sensor assemblies that might be used with the device of the invention, either as described or appropriately modified, are described hereinabove in the background section of this application.

f. Optionally other types of sensors (not shown in the figures) are installed inside the housing to measure other phenomenon of interest, e.g. smoke detectors, fire detectors, carbon monoxide detectors, and temp detectors.

g. A directional video imaging camera 38 is affixed to the interior of the housing such that its objective lens 40 is pointing outward from the interior of the housing 14. As the housing 14 rotates about the vertical axis 16, the field of view of video imaging camera 38 sweeps out all or part of a circle centered on axis 16. The tilt and zoom of the directional video camera can be either fixed, manually adjustable, or means can be provided for adjusting them according to commands received remote control and observation unit.

h. An optional illumination assembly comprising the circuitry needed to operate a plurality of peripheral LEDs 42 spaced around the top of the housing 14 for providing illumination for the omni-directional optics 34 and/or directional LEDs 44 mounted near objective lens 40 for illuminating the scene imaged by directional imaging camera 38 can be provided. The LEDs provide illumination in the spectral range to which each of the respective cameras is sensitive. Preferably the activation and deactivation of the LEDs of the illumination assembly is performed automatically by the internal processor of the device based on signals supplied to it by light detector 46.

i. Optionally the device may comprise a microphone 48 and/or a speaker (not shown) and/or a siren (not shown). The information acquired by the microphone can be used by the processor as one of the alarm triggers/filters and can be also used for remote listening to sounds associated with the events portrayed in the video images transmitted to the remote receiving and observation unit. Integration of a speaker in the device enables mutual audio communication between persons at the device's surroundings and the remote user. Thus, the device can also be used as an IP camera and/or as a communication device in a video conference system. The siren can be activated automatically by the processor of the device when a predetermined event is detected and/or manually by signal from the remote reception and observation unit.

j. A processing assembly 50 comprises a Digital Signal Processor (DSP) with integrated software that is capable of extracting the general direction of a predetermined phenomenon from data provided by omni-directional sensor assembly 33 and/or the sensors. Processing assembly 50 activates motor 28 to rotate the housing 14 such the directional video camera 38 is aimed in the designated direction for inspection of the phenomenon. One of the main capabilities provided by the DSP is Video Motion Detection (VMD), which allows detection of moving objects from the information obtained by the omni-directional detection sensor assembly 33. The DSP also enables additional capabilities such as sensor fusion to enable automatic alarm filtering and Image Understanding (IU) capabilities according to predefined characteristics. The IU capabilities of the DSP may include, for example automatic filtering out of alerts caused by, for example pets, authorized personnel such as housekeepers, or moving objects outside the region of interest, e.g. a person walking past a window of the room under surveillance. The DSP also enables automatic detection of distress situations such as smoke, fire, a person crying or calling for help, and a person or object falling. The processing assembly 50 provides other functions, e.g. enabling operation of other components of the device and optionally comprises memory means for storage of acquired data.

k. A communication assembly 52 provides advanced means of communication and documentation for transmitting data, including streaming audio and video signals, to a remote reception and observation unit and optionally for receiving signals from the remote unit. In preferred embodiments the reception and observation unit is a mobile personal communication device, e.g., a cellular phone, a personal digital assistant (PDA), or a laptop. The remote reception and observation unit can also be a PC or a service provider, e.g. a security center or an emergency police or fire number. The service provider can be authorized by the user to view the transmitted alerts and to react in accordance. The communication assembly may transmit the alarms to a server and the user can watch the alarms from any PC via a network to the server using a password. In preferred embodiments the remote reception and observation unit includes communication means in order to enable logging on to the device for remote monitoring and to enable transfer of control and operation commands to the device. Examples of such commands are: On/Off/Standby, manual aiming of the directional video camera, selecting or deselecting of the region of interest, stopping a false alarm or triggering an alarm manually, turning On/Off the illumination assembly, changing the address to which the alerts should be transmitted, switching between images and/or multiplexing between the Omni-directional video camera and the directional video camera.

The present invention is based on the rapid automatic transmission of alerts via a chosen network and on automatic documentation of the alerts. Almost any known method of data communication can be adapted to serve the needs of the invention and the inventors do not intend that the invention be limited to any specific method. The communication can be direct, by relay, or via a host server and the information transmitted can be digital or analog, compressed, decoded, multiplexed or raw. The data transmission might be wireless, for example based on the use of a cellular transceiver 54, or wired using conventional cables or optical fibers. Cellular networks, the internet, or satellite networks can be utilized to transmit information between the communication assembly 52 of the device 10 and the remote observation and control unit. No further elaboration shall be given about the communication methods herein since skilled persons possess all the information needed to put this aspect of the invention into practice.

The interior of housing 14 also contains circuit boards, electrical wiring, and other components (not shown in the figures) that are needed to complete the various electrical circuits necessary to allow the system to perform its various functions.

l. An internal rechargeable energy pack 56 for supplying electrical energy to power the motor 28 and other electronic components inside housing 14 is located in the static base 12. Energy pack 56 enables limited operation periods and serves as back up during electrical power interruptions.

m. A power plug 58 and other optional connectors that are located in the base 12 are in electrical communication with the interior of the housing 14 via the slip ring assembly 32. The power plug 58 enables recharge of the energy pack 56 and supplies energy when extended operation of device 10 is required. In a preferred embodiment, the base 12 has a plug 60 for wired network connection. Plug 60 is connected to slip ring assembly 32 enabling transmission of information acquired by the sensors to the wired network and transmission of operating commands received via the wired network to the processing assembly 50. The device may also be provided with one or more threaded sockets 62 in the bottom of base 12 for connecting to a tripod, a monopod, or some other arrangement for fixing the base in place. Using threaded socket/s 62 embodiment of the device can be attached to ceilings and operate "upside down". Sockets 62 enable fast and simple integration of embodiments of the device to a mobile platform such as a mini vehicle or to robots.

The cover 24 of the housing 14 must have optically transparent windows or openings in accordance to the wavelength and field of view of the imaging sensors to enable effective performance of the cameras and LEDs. Also openings or suitable windows must be provided in front of other components of the device that must communicate with the outside of housing 14, e.g. light detector 46, microphone 48, and cellular transceiver 54.

Figure 3B:
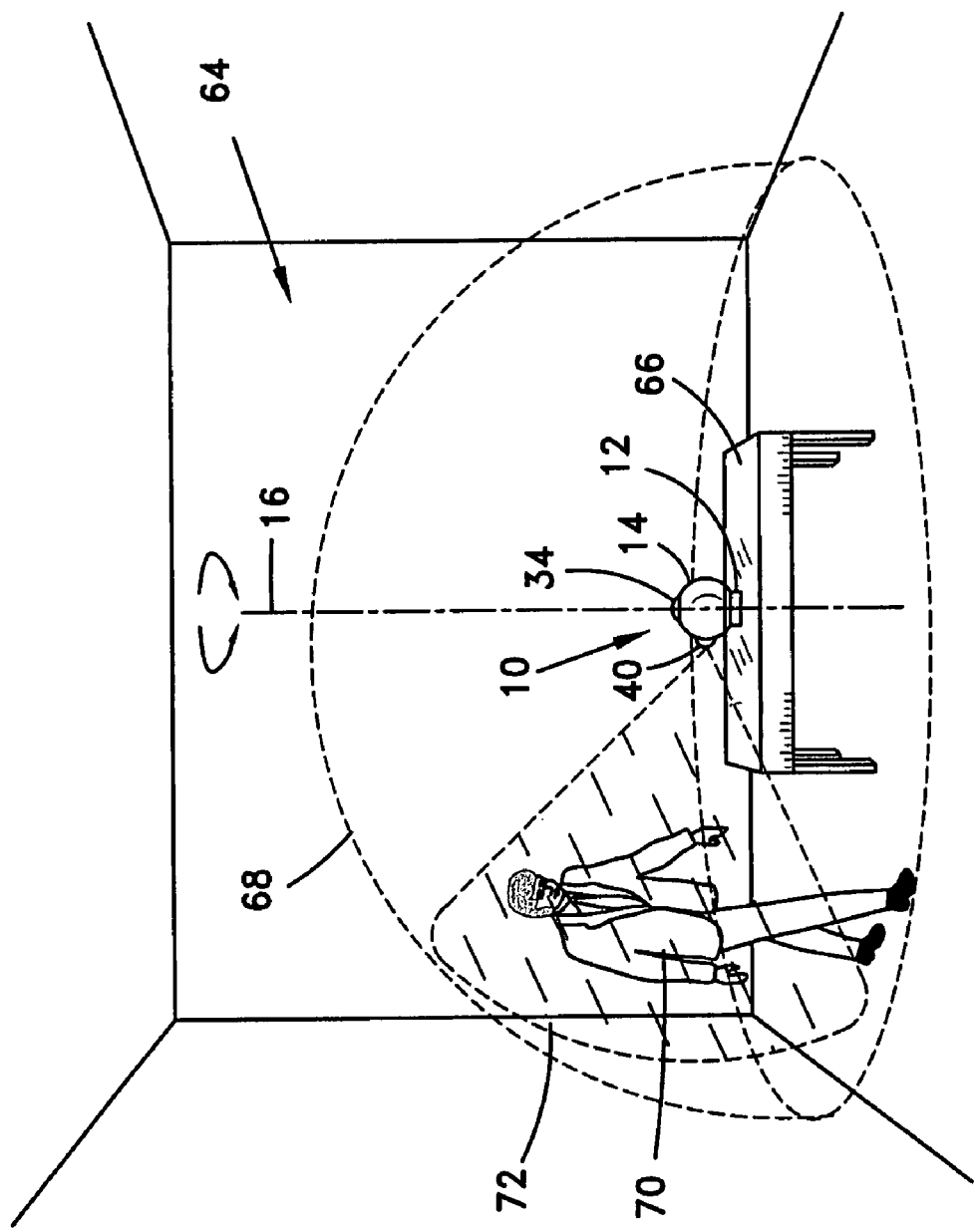

FIGS. 3A and 3B schematically depict one scenario illustrating the use of the device. In this case the device 10 is placed on a table 10 inside room 64. The self contained device is turned on, the operator leaves the room, and device 10 begins operating according to its default definitions. The omni-directional optics 34 allows video camera 36 to collect images of anything that takes place within field of view (FOV) 68. The images are transmitted to processing assembly 50 where the DSP performs VMD on them to detect the presence of moving objects within FOV 68 and to determine there direction. Once a moving object 70 has been detected motor 28 is activated to rotate housing 14 relative to base 12 until objective lens 40 of directional video camera 38 is pointed directly towards moving object 70. As object 70 continues moving housing 14 is rotated to keep object 70 in the center of FOV 72 of lens 40. In this example the streaming video acquired by video camera 38 along with other information, e.g. sounds picked up by the integral microphone 48 are transmitted to the user's cellular phone and to a security center.

Although embodiments of the invention have been described by way of illustration, it will be understood that the invention may be carried out with many variations, modifications, and adaptations, without exceeding the scope of the claims.

The invention claimed is:

1. A self contained, compact, portable observation device comprising:
   a static base, a rotatable housing, and means for rotating said housing relative to said base;
   a slip ring assembly configured to allow two-way transmission of electrical power and signals between the base and electric components inside the housing while avoiding tangling wires while said housing undergoes unlimited rotation in either direction relative to said base;
   wherein said rotatable housing comprises omni-directional detection means, directional inspection means, a processing assembly for identifying the occurrence of predetermined events within the field of view of said omni-directional detection and for automatic aiming of said directional inspection means at the location at which said predefined events take place, and a communication assembly that enables automatic transmission and documentation of predefined events to a remote receiving and observation unit;
   wherein the omni-directional detection means comprises omni-directional optics integrated to a video camera system and one or more of the following: imaging sensors; microphone arrays; volume detector arrays; and heat detectors;
   wherein the directional inspection means comprises a directional video imaging camera;
   a plurality of peripheral LEDs spaced around the top of the housing for providing illumination for the omni-directional optics wherein said peripheral LEDs provide illumination in the spectral range to which said optics are sensitive; and
   a plurality of directional LEDs mounted near the objective lens of the directional video imaging camera for illuminating the scene imaged by said directional video imaging camera, wherein said directional LEDs provide illumination in the spectral range to which said camera is sensitive.

2. The device according to claim 1, wherein the housing comprises one or more non-optical sensors to measure other phenomenon of interest.

3. The device according to claim 2, wherein the one or more non-optical sensors are chosen from the group consisting: light detectors, smoke detectors, fire detectors, carbon monoxide detectors, and temp detectors.

4. The device according to claim 1, comprising a microphone to gather audio information that can be used by the processing means as an alarm trigger/filter and can be also used for remote listening to sounds associated with the events portrayed in the video images transmitted to the remote receiving and observation unit.

5. The device according to claim 1, comprising a speaker enabling mutual audio communication between persons at the device's surroundings and the remote user and enabling said device to be used as an IP camera and/or as a communication device in a video conference system.

6. The device according to claim 1, comprising a siren, which can be activated automatically by the processor of the device when a predetermined event is detected and/or manually by a signal from the remote reception and observation unit.

7. The device according to claim 1, wherein the processing assembly comprises a Digital Signal Processor (DSP) with integrated software that is capable of extracting the general direction of a predetermined phenomenon from data provided by the omni-directional sensor assembly and/or any additional sensors that may be present said device.

8. The device according to claim 7, wherein the DSP is capable of providing Video Motion Detection (VMD), which allows detection of moving objects from the information obtained by the omni-directional detection sensor assembly.

9. The device according to claim 7, wherein the DSP enables sensor fusion to enable automatic alarm filtering and Image Understanding (IU) capabilities according to predefined characteristics.

10. The device according to claim 7, wherein the DSP enables automatic detection of distress situations.

11. The device according to claim 1, wherein the communication assembly provides advanced means of communication and documentation for transmitting data, including streaming audio and video signals, to the remote reception and observation unit.

12. The device according to claim 1, wherein the communication assembly provides means for receiving signals from the remote unit to enable logging on to said device for remote monitoring and to enable transfer of control and operation commands to said device.

13. The device according to claim 1, wherein the remote reception and observation unit is one or more of the following: a cellular phone, a personal digital assistant (PDA), a laptop, a PC, or a service provider.

14. The device according to claim 1, comprising an internal rechargeable energy pack located in the static base, said power pack for supplying electrical energy to electronic components inside the housing enabling limited operation periods and serving as back up during electrical power interruptions.

15. The device according to claim 1, comprising a power plug located in the base and in electrical communication with the interior of the housing via the slip ring assembly, said power plug enabling recharge of the energy pack and supplying electrical energy when extended operation of said device is required.

16. The device according to claim 1, comprising a plug in the base for wired network connection, said plug electrically connected to the slip ring assembly to enable transmission of information acquired by the sensors to a wired network and transmission of operating commands received via said wired network to the processing assembly.

17. The device according to claim 1, wherein the processing assembly comprises means for automatic documentation of predefined events.

* * * * *